United States Patent
Landry

(10) Patent No.: US 11,981,452 B2
(45) Date of Patent: May 14, 2024

(54) INTEGRATED FLIGHT BATTERY CARGO PLATFORM

(71) Applicant: Bell Textron Inc., Fort Worth, TX (US)

(72) Inventor: Martin Landry, Prevost (CA)

(73) Assignee: Textron Innovations Inc., Providence, RI (US)

( * ) Notice: Subject to any disclaimer, the term of this patent is extended or adjusted under 35 U.S.C. 154(b) by 751 days.

(21) Appl. No.: 17/111,224

(22) Filed: Dec. 3, 2020

(65) Prior Publication Data
US 2022/0177134 A1 Jun. 9, 2022

(51) Int. Cl.
| | |
|---|---|
| *B64F 1/22* | (2024.01) |
| *B64C 39/02* | (2023.01) |
| *B64D 9/00* | (2006.01) |
| *B64D 27/24* | (2006.01) |
| *B64F 1/00* | (2024.01) |
| *B65D 19/00* | (2006.01) |
| *B65D 19/38* | (2006.01) |
| *G01G 19/52* | (2006.01) |
| *B64C 29/00* | (2006.01) |
| *B64U 50/19* | (2023.01) |
| *B64U 101/60* | (2023.01) |

(52) U.S. Cl.
CPC .............. *B64D 9/00* (2013.01); *B64C 39/024* (2013.01); *B64D 27/24* (2013.01); *B65D 19/0016* (2013.01); *B65D 19/38* (2013.01); *G01G 19/52* (2013.01); *B64C 29/0016* (2013.01); *B64U 50/19* (2023.01); *B64U 2101/60* (2023.01); *H01M 2220/20* (2013.01)

(58) Field of Classification Search
CPC ........ B64D 9/00; B64D 27/24; B64C 39/024; B64C 29/0016; B65D 19/0016; B65D 19/38; G01G 19/52; B64U 2101/60; B64U 50/19; H01M 2220/20; B64F 1/22; B64F 1/007

USPC ........................................................... 701/14
See application file for complete search history.

(56) References Cited

U.S. PATENT DOCUMENTS

| | | | |
|---|---|---|---|
| 6,027,828 A * | 2/2000 | Hahn ................... | H04M 1/0262 429/96 |
| 8,366,371 B2 | 2/2013 | Maniscalco et al. | |
| 9,139,310 B1 * | 9/2015 | Wang ..................... | B64F 1/007 |
| 9,230,227 B2 | 1/2016 | Muirhead | |
| 9,387,928 B1 * | 7/2016 | Gentry .................... | B60L 53/00 |
| 9,527,605 B1 * | 12/2016 | Gentry ................... | B65G 51/02 |

(Continued)

FOREIGN PATENT DOCUMENTS

EP     3597554 A1     1/2020

OTHER PUBLICATIONS

WiBotic, WiBotic Introduces PowerPad Pro, Significantly Enhancing UAV Capabilities for Energy and Utility, Construction, Defense and Agriculture Applications, Published May 4, 2023 via WiBotic, pp. 1-7 (pdf).*

(Continued)

*Primary Examiner* — Manglesh M Patel
(74) *Attorney, Agent, or Firm* — Bradley Arant Boult Cummings LLP

(57) ABSTRACT

An exemplary integrated battery cargo platform includes a housing having an exterior surface and a structural strength to support cargo for transit on a top surface, a battery enclosed in the housing with power contacts exposed at the exterior surface.

18 Claims, 5 Drawing Sheets

(56) References Cited

U.S. PATENT DOCUMENTS

| | | | |
|---|---|---|---|
| 9,600,798 B2 | 3/2017 | Battles et al. | |
| 9,678,507 B1* | 6/2017 | Douglas | G08G 5/0013 |
| 10,611,252 B2 | 4/2020 | Wang et al. | |
| 10,640,234 B1* | 5/2020 | Douglas | B64C 25/32 |
| 10,717,524 B1 | 7/2020 | Boyes et al. | |
| 11,541,765 B2* | 1/2023 | Booth | B60L 53/66 |
| 11,655,048 B2* | 5/2023 | Sugimoto | B64F 1/22 |
| | | | 244/114 R |
| 2009/0136839 A1* | 5/2009 | Kraznov | H01M 6/188 |
| | | | 429/160 |
| 2009/0139940 A1 | 6/2009 | Maniscalco et al. | |
| 2011/0084162 A1* | 4/2011 | Goossen | B64D 1/22 |
| | | | 244/135 C |
| 2014/0319272 A1* | 10/2014 | Casado | B60L 50/52 |
| | | | 244/110 E |
| 2015/0183326 A1* | 7/2015 | Ryberg | B60L 53/80 |
| | | | 320/109 |
| 2016/0209290 A1 | 7/2016 | Shue | |
| 2017/0129603 A1* | 5/2017 | Raptopoulos | G08G 5/0069 |
| 2017/0247113 A1* | 8/2017 | Sanlaville | B64D 47/08 |
| 2017/0282734 A1* | 10/2017 | Noorani | B64U 20/70 |
| 2018/0265222 A1 | 9/2018 | Takagi | |
| 2019/0061925 A1 | 2/2019 | Groninga et al. | |
| 2019/0077519 A1* | 3/2019 | Husain | B60L 53/30 |
| 2019/0100313 A1 | 4/2019 | Campbell | |
| 2019/0295033 A1* | 9/2019 | Longin | B64C 39/024 |
| 2019/0375499 A1 | 12/2019 | McCullough et al. | |
| 2020/0014222 A1 | 1/2020 | Lee | |
| 2020/0023829 A1 | 1/2020 | Hefner et al. | |
| 2020/0033846 A1* | 1/2020 | Buyse | G05D 1/12 |
| 2020/0212410 A1* | 7/2020 | Campbell | H01M 10/643 |
| 2020/0307857 A1 | 10/2020 | Berwin et al. | |
| 2021/0371128 A1* | 12/2021 | Rodriguez | B64F 1/322 |
| 2022/0127014 A1* | 4/2022 | Cowden | B64F 1/007 |
| 2022/0247347 A1* | 8/2022 | Gavrilov | H02S 40/10 |
| 2023/0031028 A1* | 2/2023 | Ehasoo | B60L 53/00 |
| 2023/0312145 A1* | 10/2023 | Scott | B64U 70/92 |
| | | | 244/137.1 |

OTHER PUBLICATIONS

Loz Blain, Axial stack battery design could unlock the era of supersonic electric airliners, Published Sep. 26, 2016 newatlas.com, pp. 1-29 (pdf).*

* cited by examiner

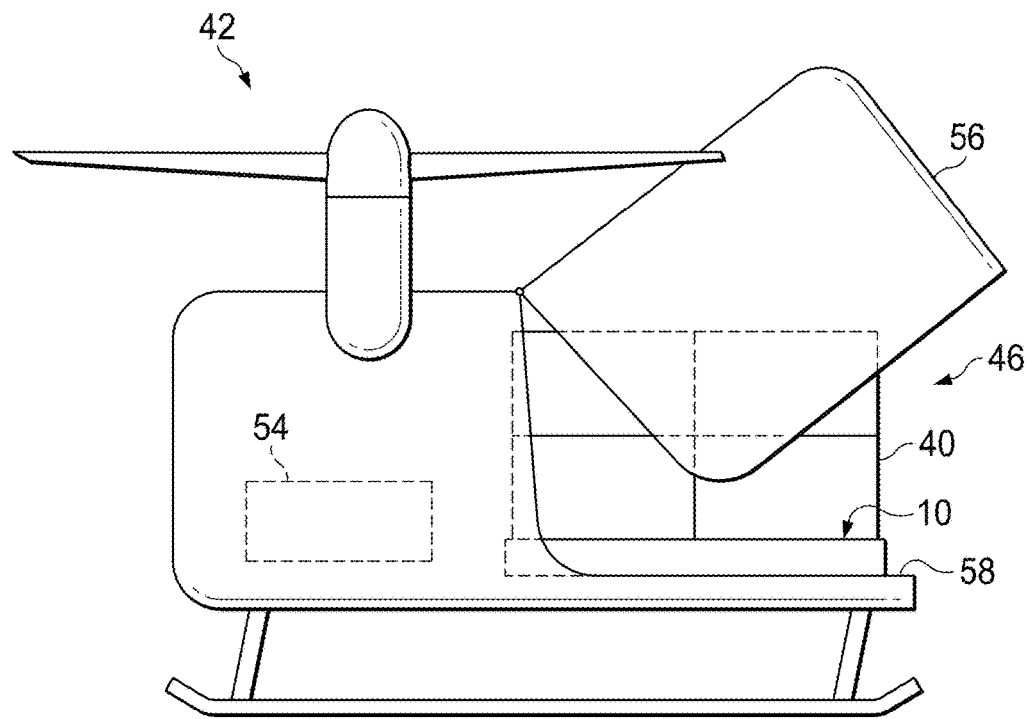
FIG. 8
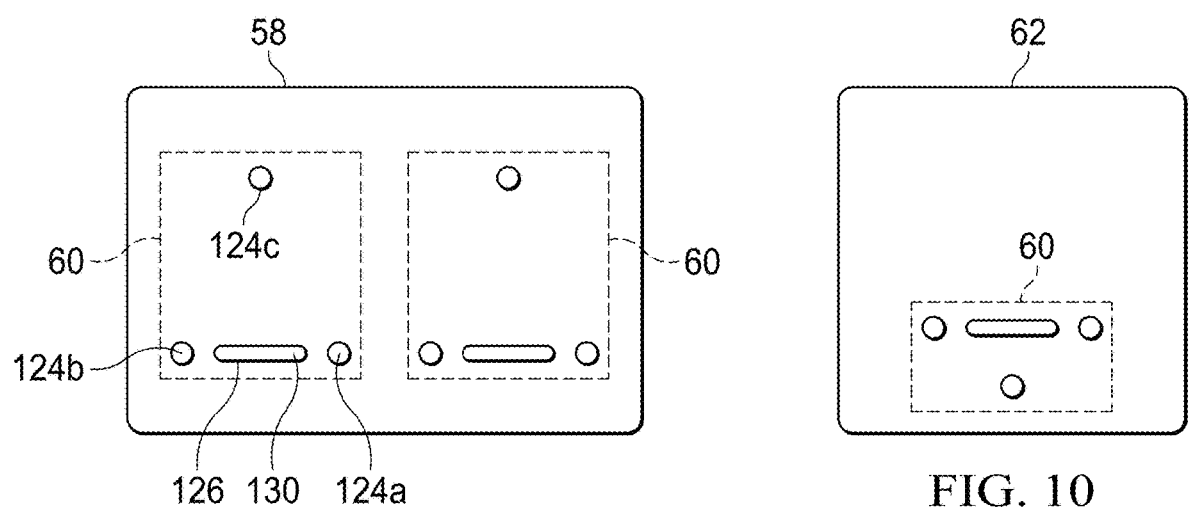
FIG. 9
FIG. 10

INTEGRATED FLIGHT BATTERY CARGO PLATFORM

TECHNICAL FIELD

This disclosure relates in general to the field of aircraft, and more particularly, but not by way of limitation, to a flight battery integrated in a cargo platform.

BACKGROUND

This section provides background information to facilitate a better understanding of the various aspects of the disclosure. It should be understood that the statements in this section of this document are to be read in this light, and not as admissions of prior art.

Increasing efforts are being made to transport cargo via electric transportation. In particular there is a focus on transporting cargo with electric aircraft such as vertical takeoff and landing aircraft and unmanned drones.

SUMMARY

An exemplary integrated battery cargo platform includes a housing having an exterior surface and a structural strength to support cargo for transit on a top surface, a battery enclosed in the housing with power contacts exposed at the exterior surface.

An exemplary method includes disposing a cargo platform in a transportation vehicle, the cargo platform comprising a housing enclosing a battery with power contacts exposed at an exterior surface of the housing, and cargo supported on a top surface of the housing, and coupling the battery via the power contacts to an electrical system of the transportation vehicle.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 8 illustrates an exemplary integrated battery cargo platform in a cargo bay of an exemplary transportation vehicle.

FIG. 9 illustrates a floor of a cargo bay with an exemplary electric connector pattern operable to mate with an exemplary integrated battery cargo platform.

FIG. 10 illustrates a vertical wall of a cargo bay with an exemplary electric connector pattern operable to mate with an exemplary integrated battery cargo platform.

DETAILED DESCRIPTION

Figure 1:
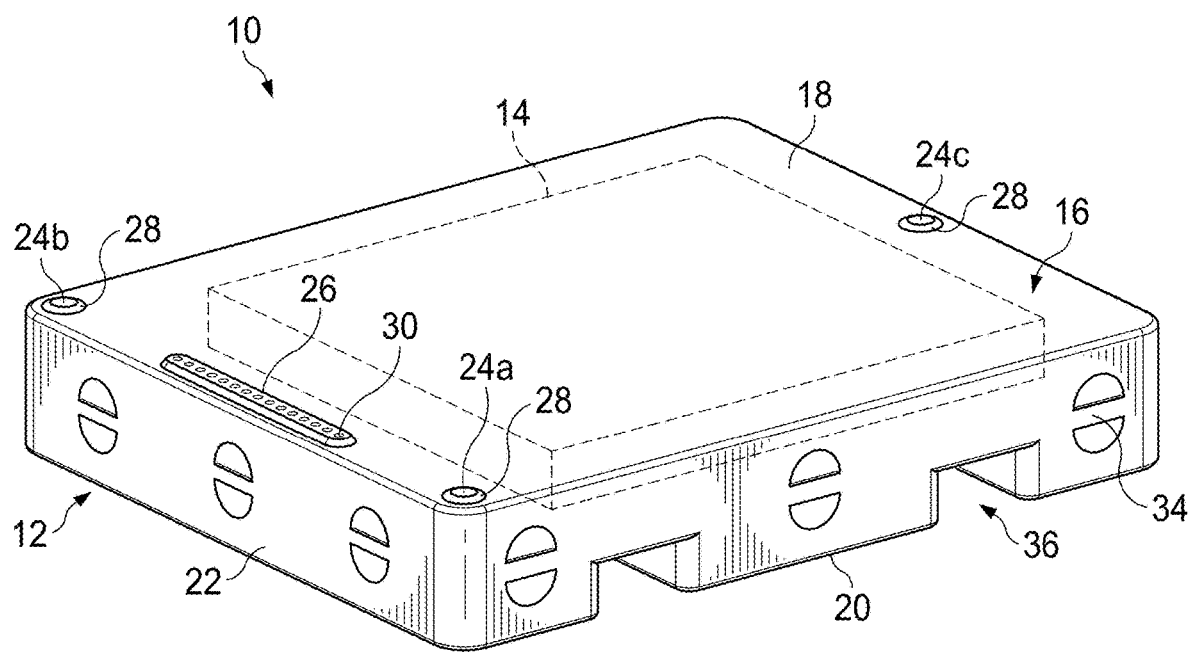
FIG. 1 is a perspective view of an exemplary integrated battery cargo platform.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Exemplary integrated battery cargo platforms 10 are described with reference to the various figures. Integrated battery cargo platforms 10 facilitate the ability to simultaneously load cargo and change batteries in an electric transit vehicle. In some embodiments, integrated battery cargo platforms can be stacked to increase the battery capacity and the range of the electric transit vehicle. The integrated battery cargo platform can be utilized with various types of transit vehicles and electrical systems. In some embodiments, the integrated battery cargo platform is operable to power an electric propulsion system of a vertical takeoff and landing aircraft, such as, and without limitation a cargo drone.

Figure 6:
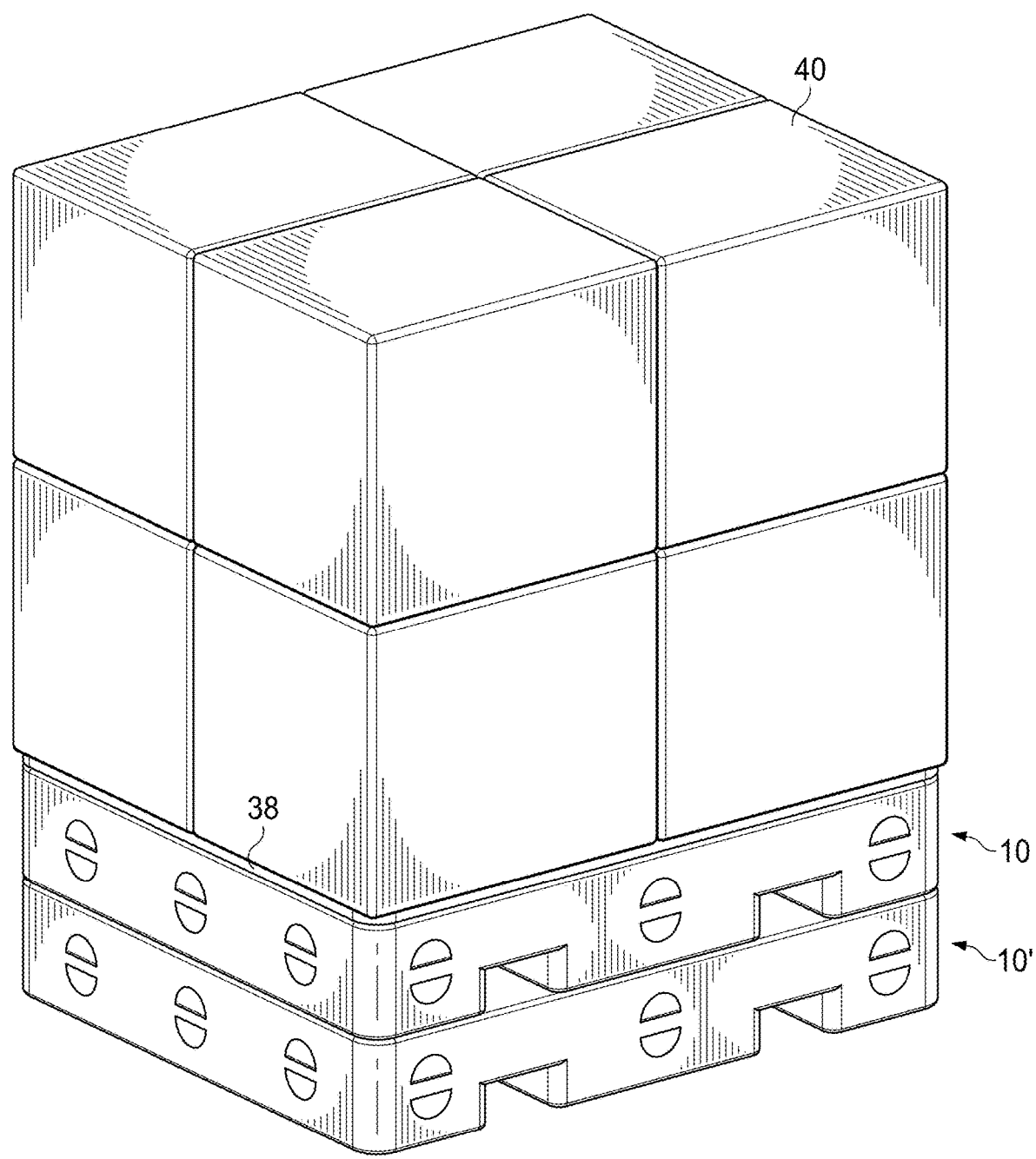
FIG. 6 illustrates exemplary integrated battery cargo platforms in a stacked arrangement.
Figure 7:
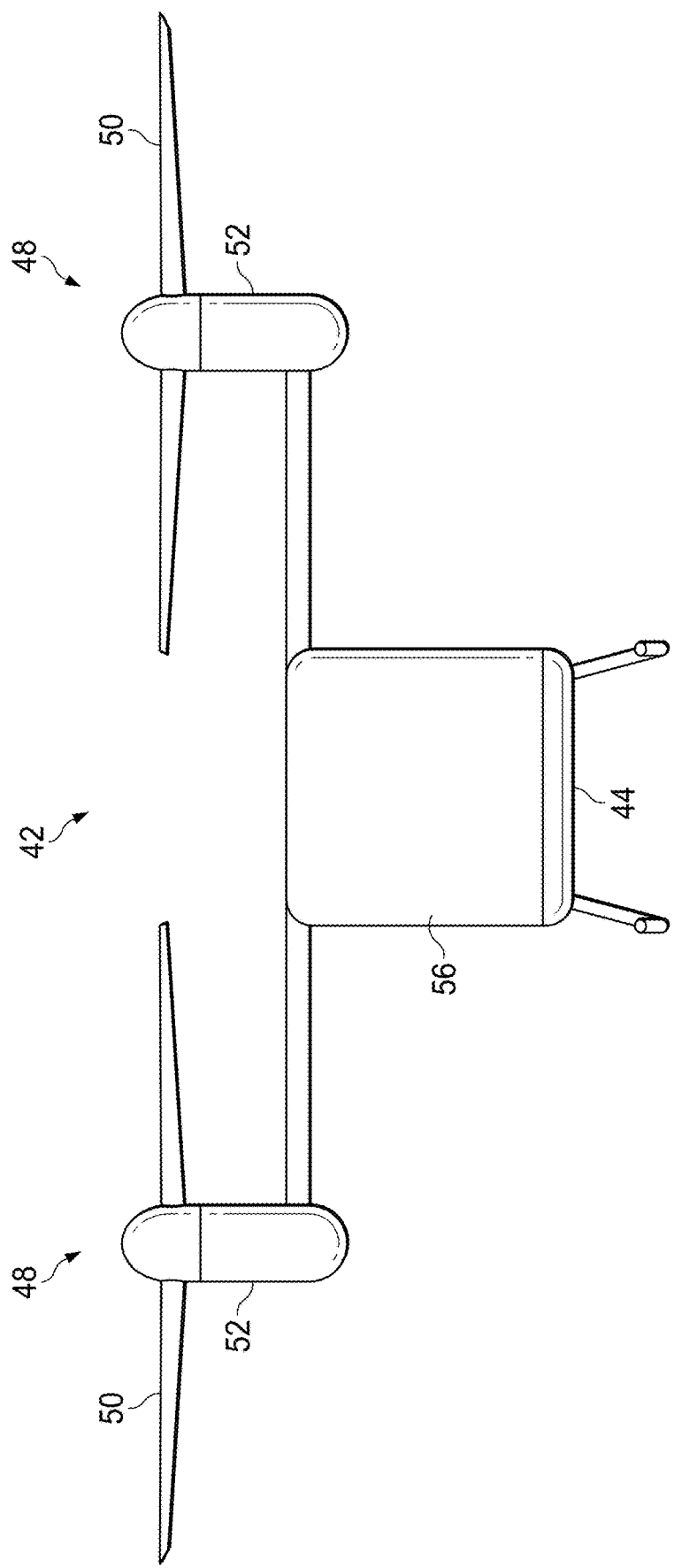
FIG. 7 illustrates an exemplary transportation vehicle that may incorporate an integrated battery cargo platform.

Cargo platform 10 includes a housing 12 enclosing a battery 14. Battery 14 may be operable to supply power to an electric system, such as a propulsion system, of a transportation vehicle, which may be a land, marine, or air vehicle. According to an embodiment, battery 14 is a lithium-ion battery have a plurality of cells 14a. Other batteries in existence and as later developed may be utilized. Housing 12 is constructed of a material that has sufficient strength to support cargo 40 (FIG. 6). The cargo load may be limited by the type of transportation vehicle. The cargo load will also be related to weight of batteries required. For example, a load may be limited to about 40 pounds or less for some drones. Some electric vertical takeoff and landing (eVTOL) aircraft may be configured for cargo loads of up to about 150 pounds. Some eVTOL aircraft are configured for loads in excess of 150 pounds. Housing 12 may be constructed of a material that is fire resistant. In some embodiments, housing 12 has lateral dimensions similar to standard pallets so that it can be transported with traditional forklifts. Housing 12 may include forklift channels.

Housing 12 has an exterior surface 16 that includes a top surface 18, a bottom surface 20, and side surfaces 22. Battery 14 includes power contacts, generally denoted 24, that are exposed at exterior surface 16 so that they can be accessed for connecting to a transportation vehicle's electrical system and for charging. Power contacts 24 include a positive contact 24a and a negative contact 24b. Power contacts 24 may include a ground contact 24c. Power contacts 24 may be located on any or all surfaces and at least one set of power contacts are positioned so that battery 14 can be connected for charging or discharging when a cargo load is supported on top surface 18. For example, housing 12 includes power contacts 24 on bottom surface 20 and/or side surfaces 22 for charging and discharging to a transportation vehicle system.

Figure 2:
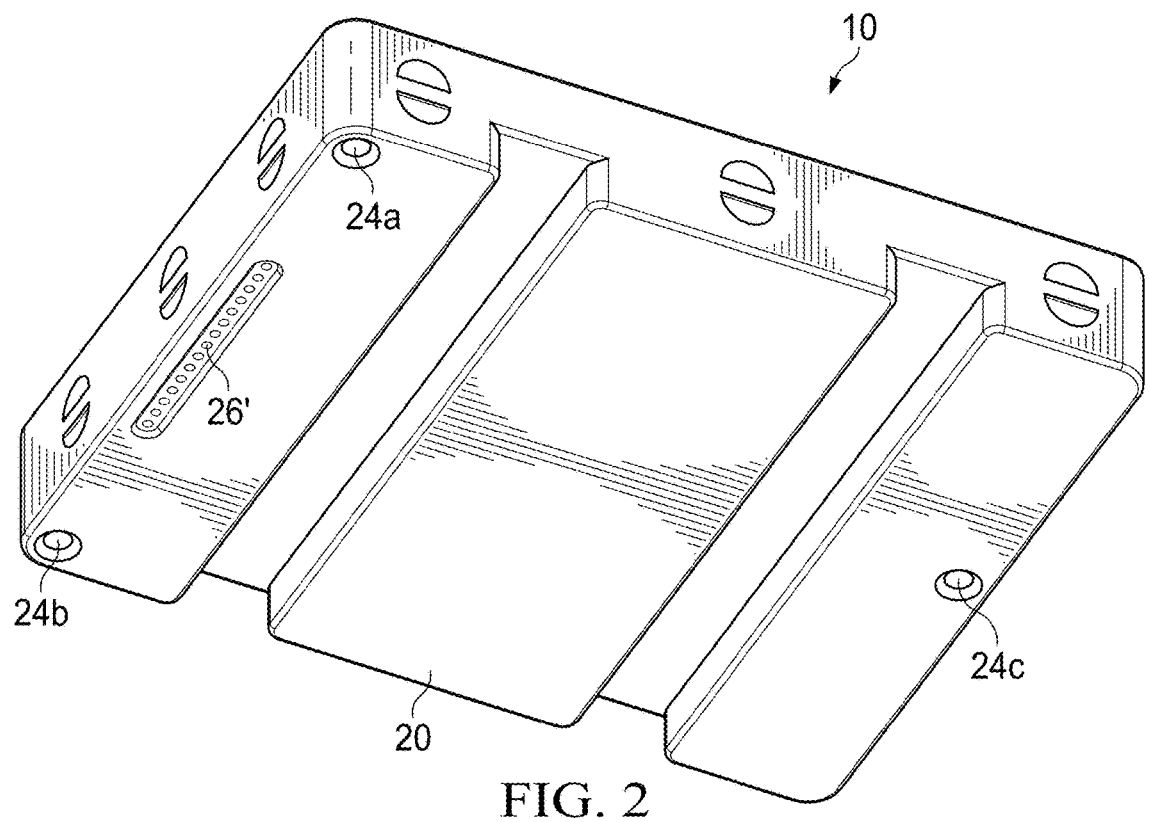
FIG. 2 is a bottom view of an exemplary integrated battery cargo platform.

Battery 14 may include additional sets of power contacts so that cargo platforms 10 can be stacked and their respective batteries electrically connected. For a long-distance transit, for example, two or more cargo platforms may be stacked to increase the battery capacity. FIGS. 1 and 2 illustrate an exemplary cargo platform 10 with an arrangement of power contacts facilitating stacking of cargo platforms to electrically connect their respective batteries. In this example, power contacts 24 are exposed at top surface 18 and at bottom surface 20. The top and bottom contacts are axially aligned so that when the cargo platforms are stacked their batteries are connected in parallel increasing the battery capacity available for the transportation vehicle. For example, top and bottom positive contacts 24a are axially aligned, top and bottom negative contacts 24b are axially aligned, and top and bottom ground contacts 24c are axially aligned.

Some or all of the power contacts 24 may be recessed into the housing, generally level with the exterior surface, or extending away from the exterior surface. For example, in the embodiment of FIGS. 1 and 2, top power contacts 24a, 24b, and 24c are raised relative to top surface 18 and bottom power contacts 24a, 24b, and 24c are recessed into housing 12. When cargo platforms 10 of this configuration are stacked, the top and bottom power contacts of the respective top and bottom housings mate and reduce lateral movement of the housing relative to one another. Load sensors may be located proximate one or more of the power contacts. A non-conductive plate may cover the power contacts and the load sensors when cargo is loaded onto the top surface.

Housing 12 may include one or more additional electrical connectors 26 exposed at the exterior surface 16 and connected to the battery and/or one or more other electrical systems. In the illustrated example, additional connector 26 is a multiple connector, such as a balance connector coupled to battery 14. Electrical connector 26 may connect to additional systems, such as control systems, electronics, and sensors. Similar to power contacts 24, electrical connectors 26 may be located on opposing exterior surfaces and axially aligned to electrically connect connectors 26 of stacked cargo platforms 10. For example, connector 26 on top surface 18 may be of a first type and connector 26' on bottom surface 18 may be of a second type, where the first type and the second type are operable to mate with one another.

Figure 4:
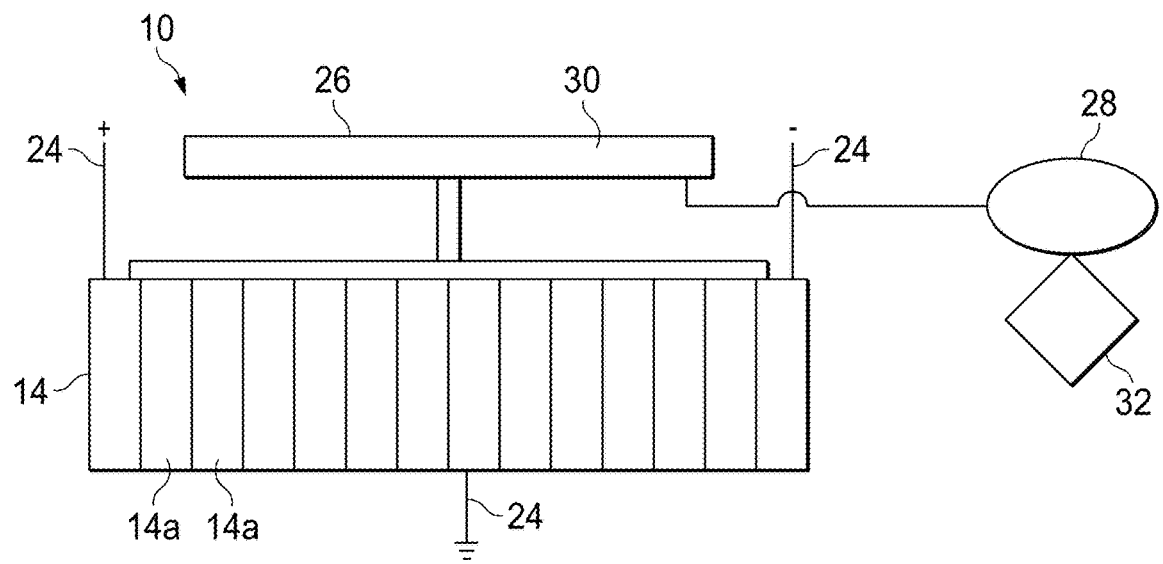
FIG. 4 illustrates exemplary electric components of an exemplary integrated battery cargo platform.

Cargo platform 10 may include one or more load sensors 28, e.g. strain gauges, operable to measure a load on housing 12, for example the weight of the cargo on top surface 18. Load sensors 28 are illustrated located with power contacts 24 in the exemplary embodiment illustrated in FIGS. 1 and 2. Load sensor 28 is coupled to an electrical connector 30, which may be included in electrical connector 26. Electronics 32 (FIG. 4) may be coupled with load sensor 28 and the electrical connector to determine for example a total weight of cargo platform 10 and to communicate that information to the transportation vehicle. The electronics may determine a center of gravity of the loaded cargo platform and communicate that information to the transportation vehicle.

Housing 12 may include attachments 34 located on side surfaces 22 for cargo tie-downs. In some embodiments, housing 12 includes forklift channels 36.

Figure 5:
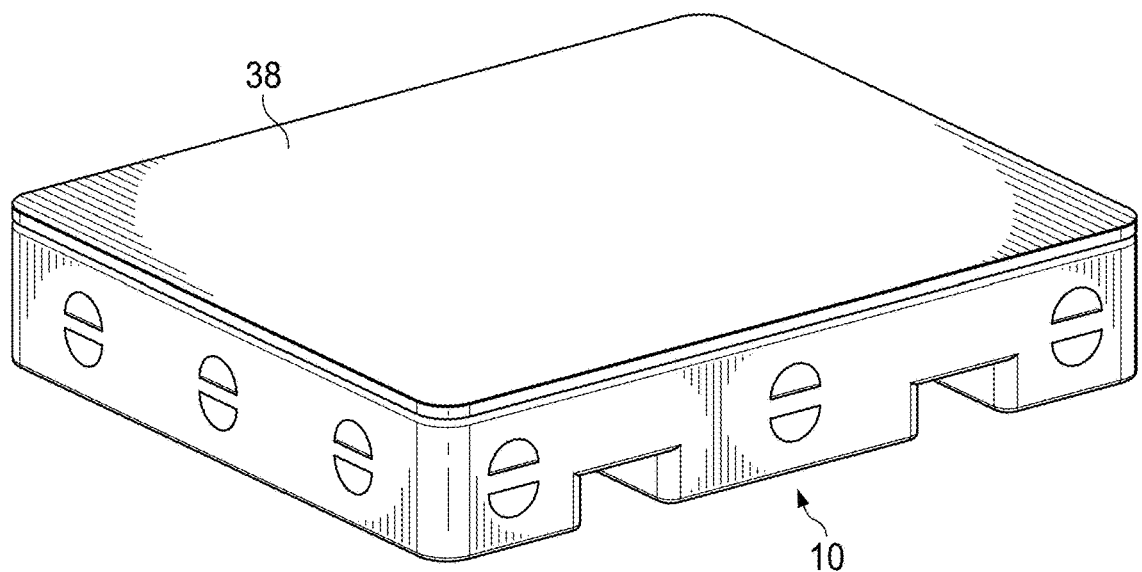
FIG. 5 illustrates an exemplary non-conductive plate positioned on a top surface of an exemplary integrated battery cargo platform.

With reference in particular to FIGS. 1, 5 and 6, cargo platform 10 may include power contacts 24 on top surface 18 for stacking cargo platforms 10 to increase the battery capacity for the transportation vehicle for example as described above. Cargo platforms 10 may include a plate 38 constructed of an electrically non-conductive material to be removably positioned on the top surface to cover top power contacts 24 when they are not needed for connection with another cargo platform. For example, in FIG. 6, a first cargo platform 10 is stacked on a second cargo platform 10', electrically connecting the batteries of the first and second cargo platforms. Top cargo platform 10 includes protective plate 38 on its top surface protecting personnel when loading cargo 40 onto the cargo platform as well preventing shorting across the power contacts. In the illustrated exemplary embodiment, protective plate 38 is a rigid member extending across load sensors 28 so that the weight of the cargo acts on the load sensors.

Power contacts 24 and electrical connectors 26, 30 are positioned and operable to couple with charging stations for example located at a warehouse or transportation loading site. The batteries may be charged for example when located in racks or stations. In some examples, cargo may be loaded onto the cargo platform and the batteries charged while waiting loading on to the transportation vehicle.

Cargo platform 10 can be utilized with various types of electrically driven transportation vehicles and/or transportation vehicles that require batteries to power electrical systems. FIGS. 7-10 illustrate exemplary aspects of an exemplary transportation vehicle 42. It should be appreciated that teachings herein apply to manned and unmanned vehicles and aircraft including without limitation airplanes, rotorcraft, hovercraft, helicopters, and rotary-wing vehicles.

FIGS. 7-10 are described with additional reference to FIGS. 1-6. Exemplary transportation vehicle 42 is a vertical and takeoff (VTOL) aircraft comprising a body 44 with a cargo bay 46 and an electric propulsion system 48. In this embodiment, electric propulsion system 48 includes fans or rotors 50 driven by an electric motor 52. Rotors 50 may be tiltable. Transportation vehicle 42 includes a controller 54, such as a flight computer, which may include one or more computers. Transportation vehicle 42 may be manned or unmanned. In illustrated exemplary embodiment, transportation vehicle 42 is an unmanned cargo drone.

FIG. 8 illustrates a door 56 opened revealing an integrated battery platform cargo platform 10 with cargo 40 positioned in cargo bay 46. Cargo platform 10 is resting on a floor 58 of the cargo bay. Cargo bay 46 may be sized to hold only a single stack of cargo or may be sized to fit two or more cargo platforms positioned side-by-side on floor 58.

Cargo platform 10 is electrically coupled to one or more electrical systems of transportation vehicle 42. For example, power contacts 24 electrically couple the battery to the vehicle's electrical system or systems. In the illustrated embodiment, integrated battery cargo platform 10 is electrically coupled to electric propulsion system 48. As described above, integrated cargo platform 10 may be electrically coupled to controller 54 to receive data from the cargo platform with regard, for example, to battery conditions, weight, cargo load, and center of gravity.

Transportation vehicle 42 has an electric connector pattern 60 matching the connector pattern on cargo platform 10. Electric connector pattern 60 may be located at one or more locations in cargo bay 46.

FIG. 9 illustrates an exemplary floor 58 having two electric connector patterns 60 configured to mate with the electrical connector pattern of cargo platform 10. As noted above, floor 58 may a single electric connector pattern 60 or include more than two electric connector patterns 60. The size of the vehicle will, in part, determine the number of cargo platforms that can placed side-by-side. In this example, electric connector pattern 60 includes power contacts 124a, 124b, 124c and electric connectors 126 and 130 corresponding the connector pattern on bottom surface 20 of the exemplary cargo platform 10 illustrated in FIGS. 1 and 2.

Figure 3:
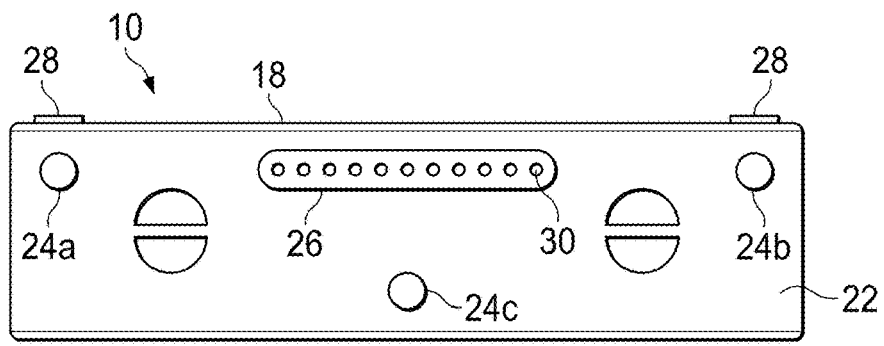
FIG. 3 is a side view of an exemplary integrated battery cargo platform.

FIG. 10 illustrates an exemplary vertical wall 62 of cargo bay 46. Vertical wall 62 includes an electric connector pattern 60 to electrically couple with a cargo platform 10 such as illustrated in FIG. 3.

As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A cargo platform comprising:
   a housing having an exterior surface and a structural strength to support cargo for transit, the cargo placed on a top surface of the housing;
   a battery enclosed in the housing with power contacts exposed at the exterior surface; and
   wherein the power contacts comprise top power contacts exposed at the top surface and bottom power contacts exposed on a bottom surface of the housing and axially aligned with the top power contacts.

2. The cargo platform of claim 1, wherein the power contacts comprise a positive contact, a negative contact, and a ground contact.

3. The cargo platform of claim 1, wherein the power contacts are exposed at a side surface.

4. The cargo platform of claim 1, wherein the power contacts are recessed into the housing.

5. The cargo platform of claim 1, further comprising a balance connector exposed at the exterior surface, the balance connector coupled to the battery.

6. The cargo platform of claim 1, further comprising a load sensor operable to measure a load on the top surface; and
   a first electrical connector coupled to the load sensor, the first electrical connector exposed at the exterior surface of the housing and operable to communicate the load measured by the load sensor.

7. The cargo platform of claim 1, further comprising a load sensor operable to measure a load on the top surface and electronics operable to determine a total weight and a center of gravity of the cargo platform; and
   a first electrical connector exposed at the exterior surface and coupled to the electronics.

8. The cargo platform of claim 1, wherein the top power contacts and the bottom power contacts each comprise a positive contact, a negative contact, and a ground contact.

9. The cargo platform of claim 1, comprising:
   a top balance connector coupled to the battery and exposed at the top surface; and
   a bottom balance connector coupled to the battery and exposed at the bottom surface and axially aligned with the top balance connector.

10. The cargo platform of claim 1, comprising:
    a load sensor operable to measure a load on the top surface; and a first electrical connector coupled to the load sensor, the first electrical connector exposed at the bottom surface of the housing and operable to communicate the load measured by the load sensor.

11. The cargo platform of claim 1, further comprising a load sensor operable to measure a load on the top surface and electronics operable to determine a total weight and a center of gravity of the cargo platform; and
a first electrical connector coupled to the electronics and exposed at the bottom surface.

12. A method comprising:
disposing a cargo platform in a transportation vehicle, the cargo platform comprising a housing enclosing a battery with power contacts exposed at an exterior surface of the housing, cargo to be carried in transit by the transportation vehicle supported on a top surface of the housing;
coupling the battery via the power contacts to an electrical system of the transportation vehicle; and
the transportation vehicle carrying the cargo and the cargo platform in transit;
wherein:
the battery comprises top power contacts exposed at a top surface of the housing and bottom power contacts exposed on a bottom surface of the housing, the top power contacts and the bottom power contacts axially aligned;
the cargo platform is a first cargo platform positioned on the top surface of a second cargo platform thereby electrically connecting the bottom power contacts of the first cargo platform to the top power contacts of the second cargo platform; and
the bottom power contacts of the second cargo platform coupled to the electrical system of the transportation vehicle.

13. The method of claim 12, wherein the transportation vehicle is an aircraft, and the electrical system is an electric propulsion system.

14. The method of claim 12, further comprising electronically communicating a weight of the cargo platform to the transportation vehicle.

15. The method of claim 12, wherein:
the transportation vehicle is a vertical takeoff and landing (VTOL) aircraft;
the electrical system is an electric propulsion system; and
the power contacts are exposed at a bottom surface of the housing and coupled to the electrical system through contacts on a floor of the VTOL aircraft.

16. The method of claim 12, wherein the transportation vehicle is a vertical takeoff and landing aircraft, and the electrical system is an electric propulsion system.

17. The method of claim 16, further comprising electronically communicating from the cargo platform to the transportation vehicle a weight of the cargo platform and the cargo.

18. The method of claim 12, further comprising a nonconductive plate positioned between the cargo and the top power contacts of the first cargo platform.

* * * * *